(12) United States Patent
Mueller

(10) Patent No.: US 9,753,459 B2
(45) Date of Patent: Sep. 5, 2017

(54) METHOD FOR OPERATING A MOTOR VEHICLE

(71) Applicant: Robert Bosch GmbH, Stuttgart (DE)

(72) Inventor: Alexander Mueller, Bietigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/962,565

(22) Filed: Dec. 8, 2015

(65) Prior Publication Data

US 2016/0170413 A1    Jun. 16, 2016

(30) Foreign Application Priority Data

Dec. 10, 2014   (DE) .................. 10 2014 225 383

(51) Int. Cl.
G05D 1/02    (2006.01)
G05D 1/00    (2006.01)

(52) U.S. Cl.
CPC ... G05D 1/0088 (2013.01); *G05D 2201/0213* (2013.01)

(58) Field of Classification Search
CPC .............. G05D 1/0088; G05D 2201/0213
USPC .................................................. 701/23–36
See application file for complete search history.

(56) References Cited

U.S. PATENT DOCUMENTS

| | | | | |
|---|---|---|---|---|
| 5,521,580 A * | 5/1996 | Kaneko | ............ | B60K 28/02 180/272 |
| 7,068,154 B2 * | 6/2006 | Kudo | .............. | G06K 9/00 340/435 |
| 7,561,966 B2 * | 7/2009 | Nakamura | ......... | G01C 21/365 340/461 |
| 8,493,199 B2 * | 7/2013 | Koehler | ........... | B62D 15/0285 180/272 |
| 8,676,488 B2 * | 3/2014 | Nagata | ............. | B60W 50/06 340/435 |
| 9,507,345 B2 * | 11/2016 | Takamatsu | ......... | B60W 30/00 |
| 2005/0123173 A1 * | 6/2005 | Isaji | ................ | G08G 1/166 382/104 |
| 2008/0161986 A1 * | 7/2008 | Breed | ............... | G08G 1/161 701/23 |
| 2008/0161987 A1 * | 7/2008 | Breed | ............... | G08G 1/161 701/27 |
| 2009/0040196 A1 * | 2/2009 | Duckstein | ......... | B60K 35/00 345/204 |
| 2010/0289632 A1 * | 11/2010 | Seder | ............... | G01S 13/723 340/436 |
| 2011/0148613 A1 * | 6/2011 | Koehler | ........... | B62D 15/0285 340/438 |
| 2012/0065841 A1 * | 3/2012 | Nagata | ............. | B60W 50/06 701/36 |
| 2014/0148988 A1 * | 5/2014 | Lathrop | ........... | B60W 50/10 701/23 |
| 2015/0228195 A1 * | 8/2015 | Beaurepaire | ....... | G08G 1/0962 340/907 |
| 2015/0274178 A1 * | 10/2015 | Tsuyunashi | ........ | B60W 30/095 701/36 |

(Continued)

*Primary Examiner* — Tyler J Lee

(74) *Attorney, Agent, or Firm* — Norton Rose Fulbright US LLP; Gerard Messina

(57) ABSTRACT

In a method for operating a motor vehicle which is configured to autonomously drives to a predefined travel destination, a driver's line of view is detected, and the autonomous driving operation is influenced as a function of the detected driver's line of view.

15 Claims, 2 Drawing Sheets

(56) References Cited

U.S. PATENT DOCUMENTS

2015/0293534 A1* 10/2015 Takamatsu ............ B60W 30/00
                                                               701/28

* cited by examiner

METHOD FOR OPERATING A MOTOR VEHICLE

BACKGROUND OF THE INVENTION

1. Field of the Invention

The present invention relates to a method for operating a motor vehicle which drives to a specified destination autonomously. In addition, the invention relates to a corresponding motor vehicle.

2. Description of the Related Art

Current motor vehicles are already able to assume partially automated driving functions. In particular, it is known to regulate the speed of a motor vehicle as a function of the speed of a vehicle driving ahead, for example. Moreover, work and research are taking place in connection with vehicles that are meant to enable a fully-automated or autonomous driving operation of the vehicle, so that a vehicle driver no longer needs to actively intervene in the driving operation once the destination to be reached has been input. Such driverless vehicles require a comprehensive surround sensor system for detecting the traffic and the closer environment of the vehicle, as well as a very precise navigation system that enables the vehicle to assume the driving task even in complex situations and to thereby reduce the driver stress. The automatic driving operation will have the result that the driver's hands are no longer kept on control devices at all times, especially the vehicle's steering wheel.

BRIEF SUMMARY OF THE INVENTION

The method according to the present invention having the features of Claim 1 has the advantage that the driver can output commands to the vehicle even without moving his or her hands to one of the control devices in order to intervene in the automated or autonomous driving operation, so that, for example, the vehicle deviates from an autonomously calculated traffic lane and/or varies an automatically calculated driving speed. To do so, a line of view of the driver is monitored and the autonomous driving operation is influenced as a function of the detected line of view. That is to say, the invention makes it possible for the driver to intervene in the autonomous driving operation of the vehicle by directing his eyes toward a particular target, especially without the need to place the hands on control elements of the vehicle. This provides a comfortable operation of the vehicle for the driver, which allows the driver to adapt the autonomous driving operation to his or her individual needs, if desired.

Preferably, the autonomous driving operation is influenced only if a verification command of the driver is detected in addition to the line of view. To ensure that no unintentional intervention takes place in the driving direction, the driver must issue a command to indicate that his current line of view is to be taken as an actuating command for the vehicle. In particular, it is provided that the driver is monitored for input gestures, manual and/or acoustic input commands. For example, it may be provided that an interior sensor system, in particular an interior camera device, continuously monitors driver motions, especially hand movements of the driver. For practical purposes at least one hand motion is stored as a reference motion. The reference motion is compared to the actual driver motions in order to then detect the verification command of the driver when the driver is executing a motion or gesture that corresponds to the reference motion and to intervene in the driving operation as a function of the current line of view of the driver.

According to one preferred further development of the present invention, a surround sensor system and/or data of a vehicle navigation system are/is used for comparing the line of view of the driver with the environment of the vehicle, so that the target of the line of view can be determined. As mentioned previously already, autonomously driving vehicles include a surround sensor system which scans the vehicle environment. Such a surround sensor system, for example, may encompass at least one camera device, at least one radar sensor, and/or at least one ultrasonic sensor. In addition, data from a navigation system are preferably analyzed in order to obtain a clear picture of the vehicle environment and, for example, to verify data acquired by the surround sensor system or to supplement such data. Having knowledge of the placement and orientation of the camera device by which the driver's line of view is ascertained may then make it possible to calculate which object in the vehicle environment is being viewed by the driver. This object will then be ascertained as the target of his or her line of view.

According to one advantageous further development of the invention, if an adjacent traffic lane is detected as the target, the vehicle changes to the adjacent traffic lane. That is to say, if the driver gazes toward the adjacent traffic lane while driving and verifies this by a spoken command, especially such as "drive in this lane", for instance, then the vehicle executes a lane change to the adjacent lane. This may also be done, for example, if the driver gazes at a traffic gap in the adjacent lane and at the same time utters the previously mentioned or, alternatively, another spoken command, such as "lane change". In order to enter the traffic gap, the vehicle will then be accelerated or decelerated and the lane change be carried out.

Moreover, in cases where a traffic sign with a speed limit is detected as the target, the motor vehicle will be accelerated or decelerated to the indicated speed. The vehicle in particular accelerates or decelerates to the desired speed if the driver verifies this by a gesture such as an upward wiping gesture of his hand. It may also be provided that when a traffic sign with a town name is determined, the indicated town will be specified as the navigation destination.

According to one advantageous further development of the present invention, if a parking space is detected as the target, the vehicle parks in the parking space. In particular a virtual or real parking button whose actuation is monitored is provided as confirmation command for this purpose. Only if the driver operates this button in addition will the parking operation be carried out.

Furthermore, it is preferably provided that when a point of interest is detected as the destination, the speed of the vehicle is reduced and/or the position of the vehicle is changed for a better view of the point of interest. This is done in particular when the driver additionally outputs a spoken command, such as "Slower, I want to see this". The speed is reduced in order to give the driver and further passengers a more extended view of the point of interest, but only in those particular cases where this is also possible in view of the traffic situation, and/or the position is changed, for instance when an adjacent vehicle blocks the view, so that the point of view may be seen.

In addition, it is preferably provided that if the point of interest is detected as the destination, information in connection with the point of interest will be displayed. The information can be presented to the driver or the vehicle passengers visually or acoustically. This is done in particular if the driver requests the information output by a confirmation command, especially a spoken command, such as the question "What is this?"

Moreover, it is preferably provided that when a vehicle driving ahead is detected as the target, a distance from the preceding vehicle is kept constant or reduced. For example, if a wiping hand gesture of the driver toward the front is detected as a verification command when the driver gazes at the vehicle driving ahead, then the vehicle distance from the preceding vehicle will be reduced. On the other hand, if a wiping hand gesture executed by an extended hand (stop hand) is ascertained, the distance will be kept constant.

The vehicle according to the present invention is characterized by a control unit which executes the method of the present invention when used as intended. Further features and advantages result from the afore-described text.

The present invention will be described in greater detail in the following text with the aid of the drawing.

DETAILED DESCRIPTION OF THE INVENTION

Figure 1:
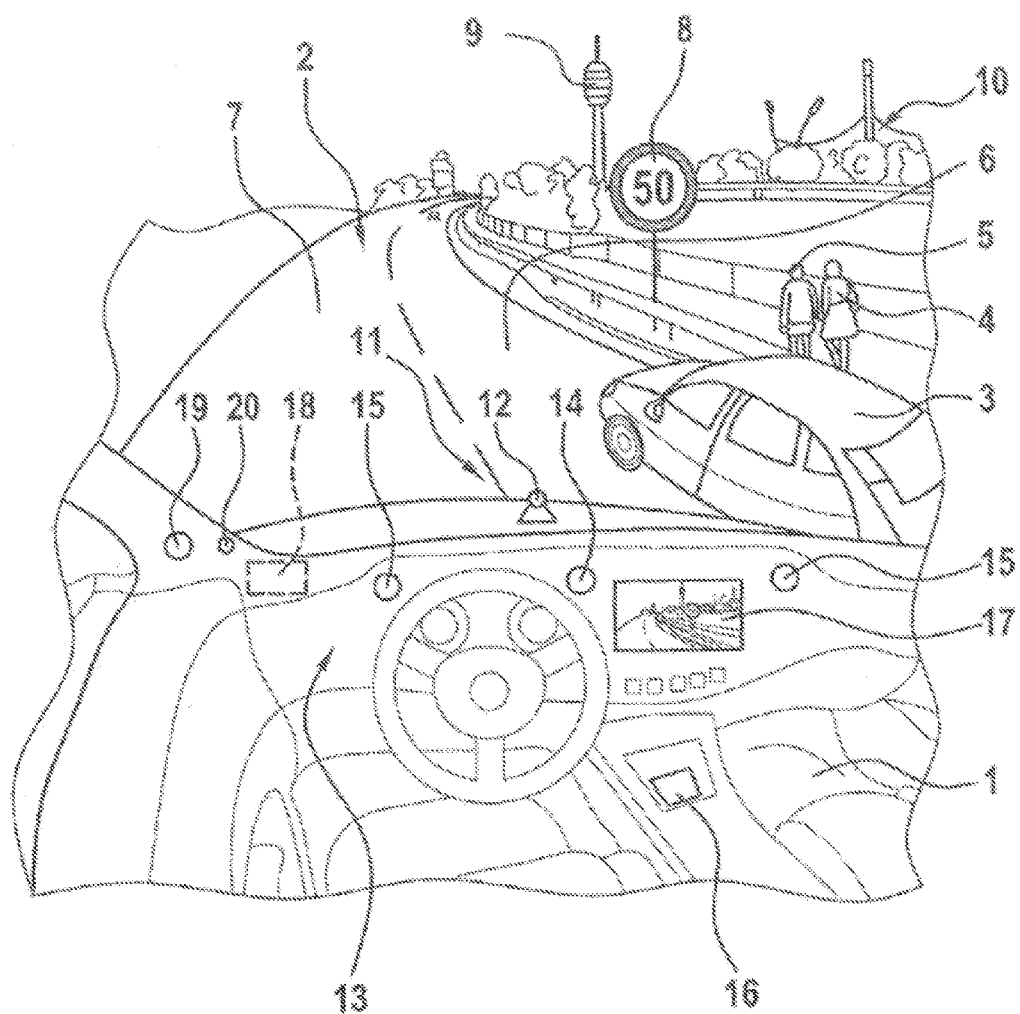
FIG. 1 shows a motor vehicle on a roadway in a simplified, perspective depiction from the vehicle driver's direction.
Figure 2:
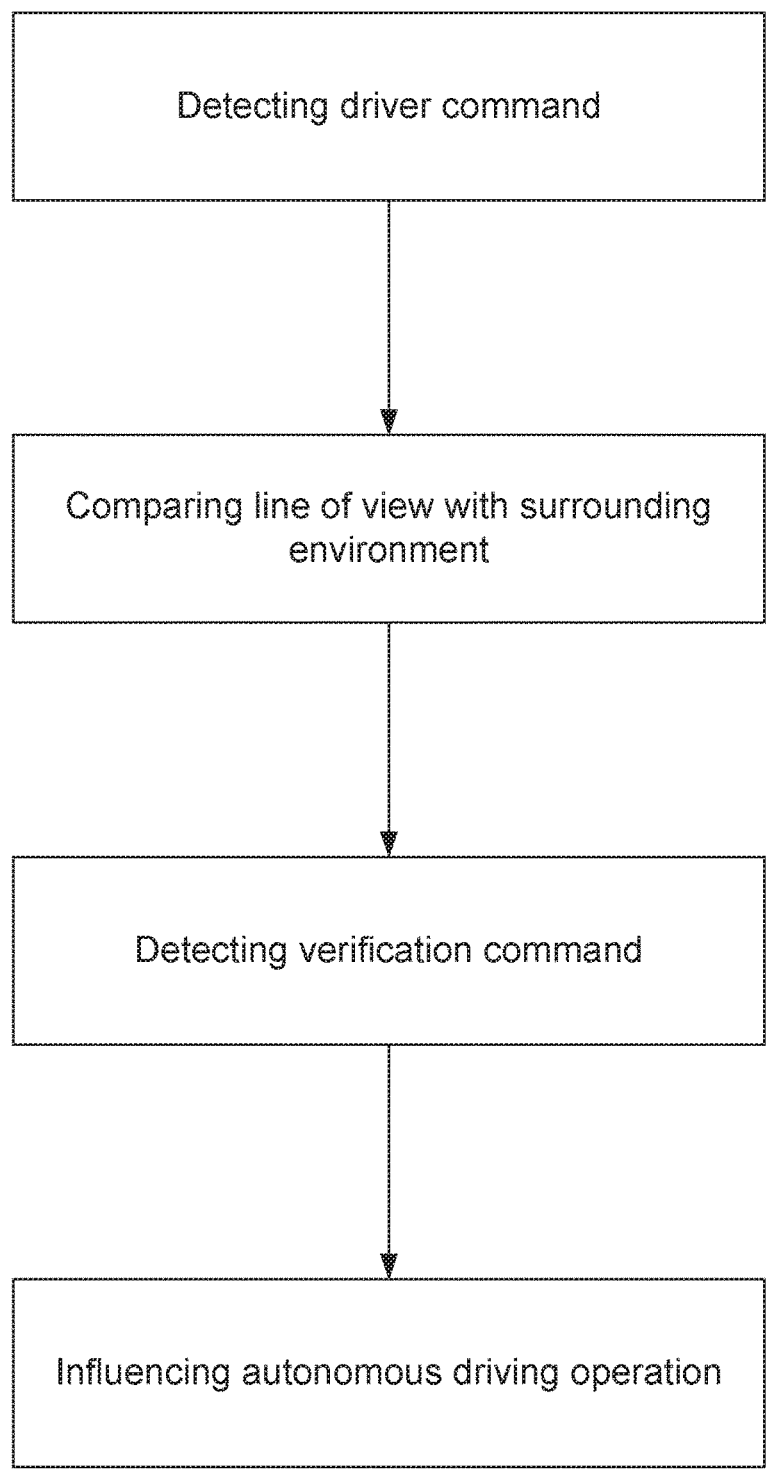
FIG. 2 shows an exemplary method for operating a host motor vehicle according to an embodiment of the disclosure.

The single FIGURE shows a motor vehicle 1 from the direction of a driver of motor vehicle 1, which is moving along a roadway 2 on which further road users 3, 4 and 5 are traveling as well. Roadway 2 has two traffic lanes 6, 7 leading in one direction, motor vehicle 1 being situated on left traffic lane 7. Situated in the right traffic lane in front of motor vehicle 1 is road user 3, which is a motor vehicle as well. In addition, a traffic sign 8, which indicates a speed limit (50 km/h), is situated along the right road edge. Points of interest of a city, such as a TV tower 9 and a sports arena 10 can be seen in the background.

On the front side, motor vehicle 1 is equipped with a surround sensor system 11, which includes a camera device 12. Camera device 12 acquires the traffic situation in front of vehicle 1 in the driving direction. While camera device 12 is provided in the region of the radiator grille of motor vehicle 1 in the present exemplary embodiment, one alternative exemplary embodiment preferably provides that camera device 12 be mounted in the base of an interior mirror of the motor vehicle and, in particular, that it points through the windshield of motor vehicle 1 toward the outside. In addition, motor vehicle 1 is equipped with an interior sensor system 13, which in particular includes a camera device 14, especially an infrared-type camera, which is pointing toward the vehicle driver in order to detect the driver's face, in particular the driver's eyes. Camera device 14 pointing to the interior could alternatively also be provided in the region of the interior mirror. In order to allow camera device 14 to be used even when the poor light conditions are poor, two infrared emitters 15 which illuminate the vehicle driver are advantageously provided in addition. Infrared emitters 15 cause reflections on the retina of the driver. With the aid of the positions of the pupil and the reflections, which are detected by camera device 14, a precise detection of the line of view of the driver of vehicle 1 is possible. Infrared emitters 15 are preferably disposed at the same distance from camera device 14 and, in particular, at the same level as camera device 14 on the instrument panel of motor vehicle 1. In addition, motor vehicle 1 has a switching device 16, which, for example, includes a push button or similar mechanism for the vehicle driver.

Furthermore, motor vehicle 1 has a navigation system 17, into which the driver of motor vehicle 1 can input a navigation destination. Motor vehicle 1 autonomously navigates to the navigation destination, in particular with the aid of surround sensor system 11, while observing traffic rules and further road users by utilizing data from navigation system 17 and surround sensor system 11.

To do so, a control unit 18 analyzes the data from surround sensor system 11, navigation system 17 and camera device 14 as well as switching device 16.

In addition, motor vehicle 1 includes an interior camera 19, which is pointing toward the driver in order to detect and analyze operating gestures of the driver, in particular hand gestures. Interior camera 19 is assigned to the A-column of motor vehicle 1 in the case at hand. As an alternative, interior camera 19 is preferably placed in a centered manner inside vehicle 1, in particular on the instrument panel, especially above switching device 16, which is disposed in the region of the armrest in this particular instance. It may also be the case that an interior camera 19, as described above, is disposed both in the region of the A-column and in the center.

Motor vehicle 1 makes it possible for the driver to intervene in the autonomous or completely automated driving operation without having to operate control elements, such as a steering wheel or a gas or brake pedal of the motor vehicle or without having to input complicated input commands. The driver's line of view is preferably used as "pointer" for detecting a control command. Switching device 16 and camera device 19 as well as a microphone 20 of interior sensor system 13 are used for confirming or initiating the command indicated by the driver's line of view.

The data from navigation system 17 and surround sensor system 11 are used for determining a target of the driver's line of view from the detected viewing direction, such as traffic sign 8, one of points of interest 9 or 10, and other road users 3. In particular the following functionalities are made possible in this manner:

If the driver gazes at adjacent traffic lane 6 and utters the spoken command "Move to this lane!", motor vehicle 1 will initiate a lane change to traffic lane 6.

If the driver looks at a traffic gap in right traffic lane 6, for instance in front of road user 3, and if the driver utters the same spoken command or some similar phrase like "lane change", for example, then motor vehicle 1 accelerates (or decelerates) in order to move into traffic lane 6 in front of road user 3.

If the driver gazes at traffic sign 8, this sign will be determined as the target, and the speed indicated on traffic sign 8 will be analyzed with the aid of data from navigation system 17 or camera setting 12. If the driver executes an upwardly directed wiping hand gesture, the motor vehicle is instructed to accelerate to the maximally allowed speed indicated by traffic sign 8. As an alternative to a wiping hand gesture, the driver could also operate switching device 16 in order to input the command for verification purposes.

If the driver looks at a traffic sign that bears the name of a town such as a place-name sign, and if the driver actuates switching device 16 or, in particular, outputs a spoken command "Drive to this destination", then navigation system 17 stores the indicated town name as the new navigation destination and starts the navigation or guides vehicle 1 to the newly input navigation destination.

In the event that the driver looks at a parking space or an unoccupied area and actuates switching device 16, which may be developed as a parking button or designated as such, then the parking maneuver into the target area marked by the line of view will be initiated.

In the event that one of the points of interest 9, 10 has been detected as the target of the driver's line of view and the spoken command "More slowly, I want to see this" is output, the motor vehicle may possibly reduce the speed and search for a vehicle position from which the vehicle occupants have an optimal view of the point of interest. For example, the motor vehicle will be accelerated or decelerated for this purpose, so that a larger vehicle such as a truck which blocks the view is circumvented.

When a point of interest 9, 10 is detected as the object of the driver's line of view, and the spoken command "What is that?" is detected in addition, information from the surround sensor system and the maps of the navigation system pertaining to points of interest 9, 10 may be displayed to the driver or to the further occupants.

If a road user driving in front is determined as the target and a wiping hand gesture of the driver toward the front is detected, the vehicle distance from the road user driving in front will be reduced.

The driver or occupant of the autonomously driving vehicle is therefore able to influence the vehicle control or the fully automated driving operation without having to place hands on the steering wheel. An intuitive and natural control of motor vehicle 1 is offered: The detected line of view establishes the context and allows the input of control commands without lengthy input modalities such as complex spoken commands or submenus. Motor vehicle 1 may be designed to enable it to execute all of the afore-described functionalities or also only individual, selected functionalities.

What is claimed is:

1. A method for operating a host motor vehicle which is configured to drive to a predefined destination autonomously, the method comprising:
   detecting, by at least one driver command detection device, a driver command, wherein the driver command comprises a driver of the host motor vehicle directing the driver's eyes toward an observation target, the driver command being unprompted by a control unit;
   determining, by the control unit, wherein the control unit has at least one processor, an autonomous driving action of the host motor vehicle corresponding to the driver command;
   receiving, by at least one driver verification command detection device, at least one verification command, wherein the at least one verification command actuates the autonomous driving action; and
   actuating, by the control unit, the autonomous driving action of the host motor vehicle upon receiving the at least one verification command.

2. The method as recited in claim 1, wherein when an adjacent traffic lane is detected as the observation target, the autonomous driving action of the host motor vehicle comprises driving the host motor vehicle to the adjacent traffic lane.

3. The method as recited in claim 1, wherein when a traffic sign indicating a speed limit is detected as the observation target, the autonomous driving action of the host motor vehicle comprises one of accelerating or decelerating the host motor vehicle to the indicated speed limit.

4. The method as recited in claim 1, further comprising:
   receiving, from at least one of a surround sensor system and a navigation system, data describing a surrounding environment of the host motor vehicle;
   comparing, by the control unit, the driver command with the data describing a surrounding environment of the host motor vehicle; and
   confirming, by the control unit, that the driver's eyes are directed to the observation target.

5. The method as recited in claim 1, wherein when a parking space is detected as the observation target, the autonomous driving action of the host motor vehicle comprises steering the host motor vehicle in a direction of the parking space and parking the host motor vehicle in the parking space.

6. The method as recited in claim 1, wherein when a point of interest is detected as the observation target, the autonomous driving action of the host motor vehicle comprises at least one of (i) reducing the speed of the host motor vehicle and (ii) changing a position of the motor vehicle to enable the driver's eyes to receive a better view of the point of interest.

7. The method as recited in claim 1, wherein when a point of interest is detected as the observation target, information relating to the point of interest is displayed via a display.

8. The method as recited in claim 1, wherein when a vehicle driving ahead is detected as the observation target, the autonomous driving action of the host motor vehicle comprises one or more of reducing and maintaining a constant distance between the host motor vehicle and the vehicle driving ahead.

9. The method as recited in claim 1, wherein the at least one verification command comprises at least one driver hand motion.

10. The method as recited in claim 9, wherein the at least one verification command is detected by the at least one driver verification command detection device when the at least one driver hand motion matches at least one reference motion stored by the control unit.

11. The method as recited in claim 1, wherein the at least one verification command comprises at least one vocal command.

12. The method as recited in claim 1, wherein the at least one verification command comprises a driver actuation of at least one of a virtual switching device and a real switching device.

13. The method as recited in claim 12, wherein a parking space driving operation is actuated by the driver operating at least one of the virtual switching device and the real switching device.

14. The method as recited in claim 1, wherein the at least one driver command detection device comprises one or more camera devices and one or more infrared emitter devices separate from the one or more camera devices.

15. A control system for an autonomous driving motor vehicle configured to drive to a predefined travel destination autonomously, the control system comprising:
   a navigation system configured to receive data describing a surrounding environment of the motor vehicle;
   a surround sensor system configured to receive data describing the surrounding environment of the motor vehicle;
   a control unit including at least one processor;
   at least one driver command detection device configured to detect a driver command, wherein the driver command comprises a driver of the motor vehicle directing the driver's eyes toward an observation target, the driver command being unprompted by the control unit;

the control unit being configured to determine an autonomous driving action of the motor vehicle corresponding to the driver command;

at least one driver verification command detection device configured to receive at least one verification command, wherein the at least one verification command actuates the autonomous driving action; and the control unit being further configured to actuate the autonomous driving action of the motor vehicle upon receiving the at least one verification command.

\* \* \* \* \*